US009596797B2

(12) United States Patent
Arksey et al.

(10) Patent No.: US 9,596,797 B2
(45) Date of Patent: Mar. 21, 2017

(54) MULTIPIECE CUTTING EDGE ATTACHMENT FOR SPRING TINES OF A HARROW

(71) Applicant: Atom Jet Industries (2002) Ltd., Brandon (CA)

(72) Inventors: Donald Arksey, Brandon (CA); Noel Lagarde, Brandon (CA); Marcel Lanoie, Brandon (CA)

(73) Assignee: ATOM JET INDUSTRIES (2002) LTD., Brandon, Manitoba (CA)

( * ) Notice: Subject to any disclaimer, the term of this patent is extended or adjusted under 35 U.S.C. 154(b) by 0 days.

(21) Appl. No.: 14/930,876

(22) Filed: Nov. 3, 2015

(65) Prior Publication Data

US 2016/0227697 A1   Aug. 11, 2016

Related U.S. Application Data

(63) Continuation of application No. 13/780,081, filed on Feb. 28, 2013, now Pat. No. 9,282,687.

(60) Provisional application No. 61/702,888, filed on Sep. 19, 2012.

(51) Int. Cl.
   *A01B 23/02*  (2006.01)
   *A01B 19/02*  (2006.01)
   *B23K 1/00*   (2006.01)

(52) U.S. Cl.
   CPC ............. *A01B 23/02* (2013.01); *A01B 19/02* (2013.01); *B23K 1/0008* (2013.01)

(58) Field of Classification Search
   CPC .................................................... A01B 23/02
   USPC ........................................ 172/707, 708, 745
   See application file for complete search history.

(56) References Cited

U.S. PATENT DOCUMENTS

| 184,089 A | 11/1876 | Laughlin |
| 1,859,350 A | 5/1932 | Wilson |
| 1,922,917 A | 8/1933 | Russell et al. |
| 1,927,818 A | 9/1933 | Brodersen |
| 1,960,879 A | 5/1934 | Russell et al. |
| 1,965,950 A | 7/1934 | Walker |
| 2,033,594 A | 3/1936 | Stoody |
| 2,906,015 A | 9/1959 | Piepho |
| 3,882,594 A | 5/1975 | Jackson et al. |
| 3,932,952 A | 1/1976 | Helton et al. |
| 3,971,323 A | 7/1976 | Beiswenger |
| 3,984,910 A | 10/1976 | Helton et al. |
| 4,277,106 A | 7/1981 | Sahley |
| 4,363,364 A | 12/1982 | Wetmore |

(Continued)

FOREIGN PATENT DOCUMENTS

JP    11172646    6/1999

*Primary Examiner* — Thomas B Will
*Assistant Examiner* — Joel F. Mitchell
(74) *Attorney, Agent, or Firm* — Kyle R. Satterthwaite; Ryan W. Dupuis; Ade & Company Inc

(57) ABSTRACT

A multi-piece cutting edge attachment for a circular shaft of a harrow tine features a mounting member formed of a material that is weldable to, and distinct from, a first material of the harrow tine. A cutting edge member is formed of a third material that is harder than the first and second materials and less weldable to harrow tine than the second material of the mounting member. The cutting edge member has a front face and an opposing rear face that is conformingly shaped for placement against a front face of the mounting member at a lower end thereof. The multi-piece arrangement forms a cutting edge of greater hardness than that which is achievable by a material directly attachable to the tine itself.

18 Claims, 5 Drawing Sheets

(56) References Cited

U.S. PATENT DOCUMENTS

| | | |
|---|---|---|
| 4,428,260 A | 1/1984 | Eby |
| 4,834,190 A | 5/1989 | Kyle |
| 4,932,478 A | 6/1990 | Jones |
| 5,027,907 A | 7/1991 | Delyea |
| 5,427,186 A | 6/1995 | Adrian et al. |
| 6,138,771 A | 10/2000 | Skaeveland |
| 6,425,446 B1 | 7/2002 | Gates |
| 7,665,234 B2 | 2/2010 | Diehl et al. |
| 7,891,436 B2 | 2/2011 | Cruson |

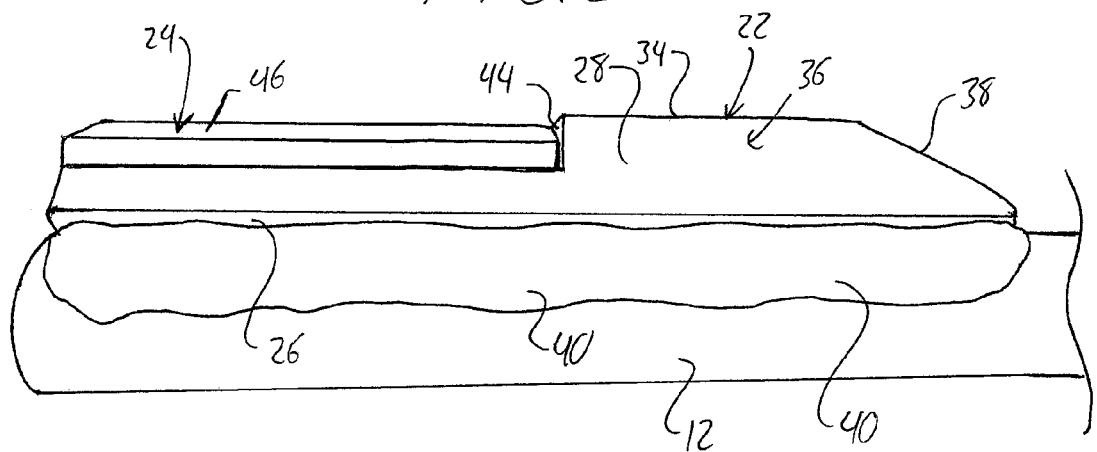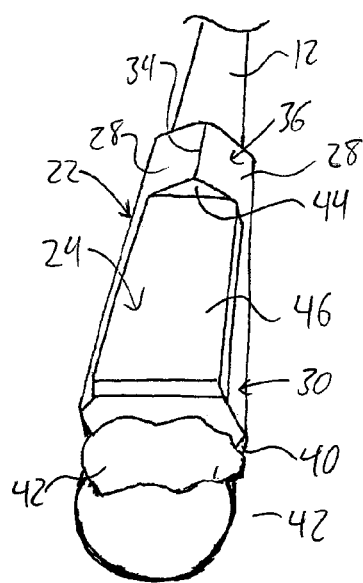

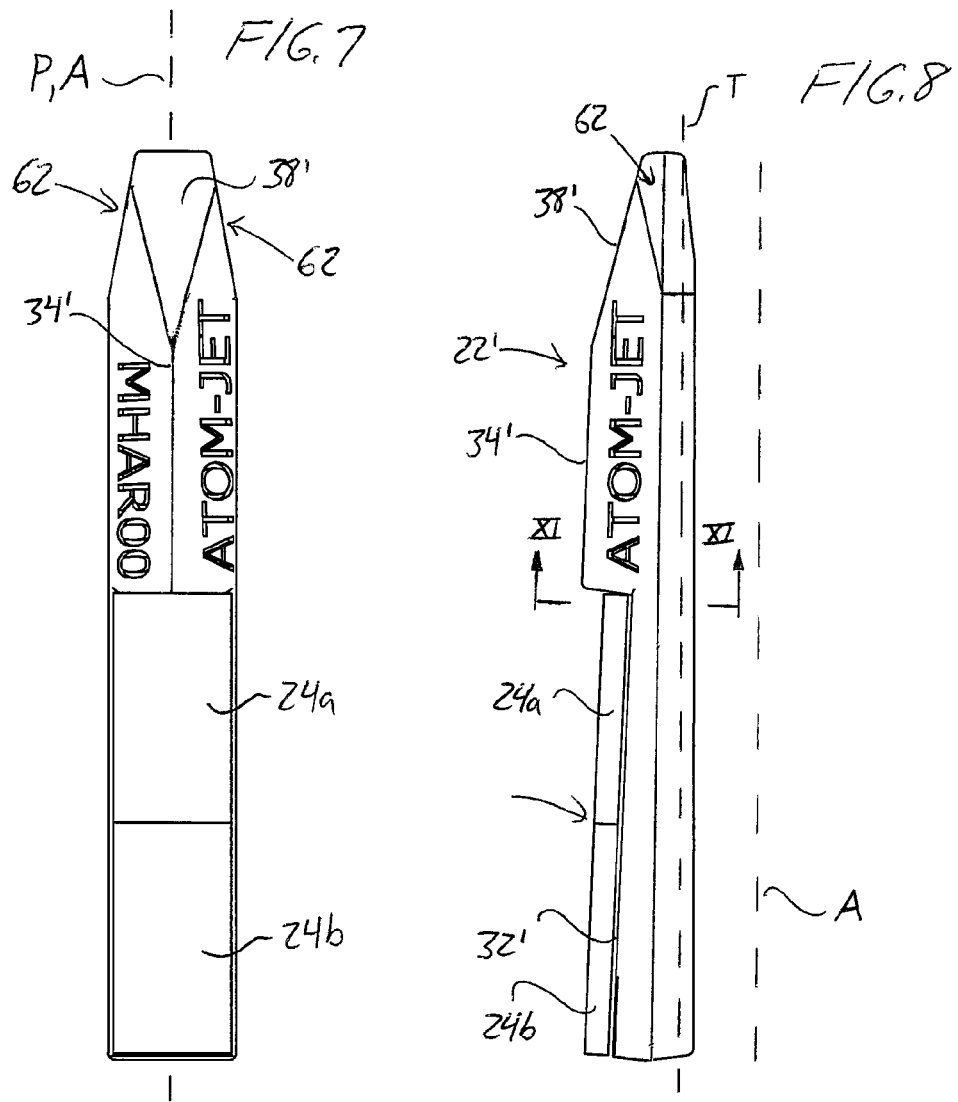
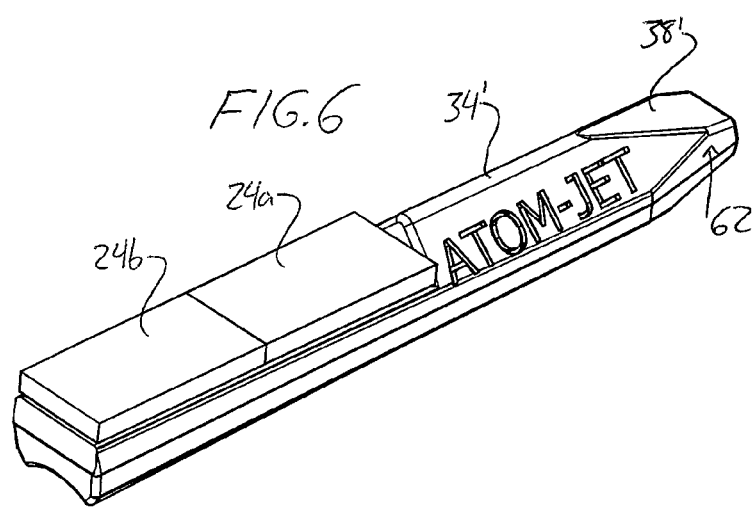

MULTIPIECE CUTTING EDGE ATTACHMENT FOR SPRING TINES OF A HARROW

CROSS REFERENCE TO RELATED APPLICATIONS

This application is a continuation of U.S. Non-provisional patent application Ser. No. 13/780,081, filed Feb. 28, 2013, which claims benefit under 35 U.S.C. 119(e) of U.S. Provisional Patent Application Ser. No. 61/702,888, filed Sep. 19, 2012, each of which is incorporated herein by reference in its entirety.

FIELD OF THE INVENTION

The present invention relates generally to harrow tines, and more particularly to a two-piece attachment for defining a hardened cutting edge at the lower end of the tine shaft by using a mounting piece of a first material suitable for easy and secure attachment to the tine and a cutting edge piece of a harder second material for maximum durability and wear life.

BACKGROUND OF THE INVENTION

A spring harrow is an implement featuring a frame that is towed over the ground by an agricultural tractor so that a set of spring tines depending downward from the frame engage the ground surface to break up and smooth out the same. A common type of spring harrow employs a double coil spring tine, where a pair of horizontally spaced apart coils wind around a shared horizontal axis with inner ends of the coils joined together by a central cross-bar running parallel to that axis. A pair of tine shafts depend downwardly from the outer ends of the two coils. The central cross-bar is mounted to the implement frame and the coils independently and respectively bias the two tine shafts downward about the coil axis to keep the lower ends of the tine shafts engaged with the ground. Single coil tines are sometimes also used, where each tine features only a single coil spring and single respective downward tine shaft.

A known problem with spring tines is they may tend to wear relatively quickly, and accordingly require frequent replacement.

U.S. Pat. No. 6,425,446 of Gates addresses this issue by mounting a one-piece hardened edge member to a front side of each tine shaft at the lower end thereof to increase the effective hardness at the leading side of the lower portion of the resulting tine structure. The member is made of chrome to provide greater hardness than the spring tine material, while being suitable for attachment to the spring tine by welding.

While the Gates solution does provide a cutting edge of improved durability relative to the tine itself, there remains room for improvement, as use of more durable materials than chrome, such as tungsten carbide, would further improve the wear life of the tine, but challenges remain in how to attach a tungsten carbide wear piece to the tine, as the tungsten carbide is not suitable for welded attachment to the spring tine.

Applicant has addressed this problem through development of a unique two-piece cutting edge attachment for harrow tines.

Other references relating to attachments for mounting on spring tines include U.S. Pat. Nos. 184,089, 4,834,190, 5,027,907 and 6,138,771, and Japanese Patent Document 11172646, which individually and collectively fail to suggest the solution put forth by the present invention.

SUMMARY OF THE INVENTION

According to a first aspect of the invention, there is provided a cutting edge attachment for a circular shaft of a harrow tine formed of spring steel, the attachment comprising:

a prefabricated mounting member comprising a solid body having a predefined shape and formed of chromium carbide that is weldable to the spring steel of the harrow tine, the solid body having a front face and an opposing rear side, the front face having a flat surface at a lower end thereof and the rear side having a concavely arcuate curvature for conforming attachment to a front surface of the circular shaft of the harrow tine adjacent a lower end thereof to position the front face of the mounting member in front of the front surface of the circular shaft;

a cutting edge member of geometric shape and comprising tungsten carbide that is harder than the chromium carbide and spring steel and less weldable to the spring steel of the harrow tine than the chromium carbide of the mounting member, the cutting edge member having a front face and an opposing flat rear face for flush placement against the flat surface of the front face of the mounting member at a lower end thereof with a remainder of the cutting edge member residing in an exposed position in front of the prefabricated mounting member;

whereby the cutting edge member is mountable on the front face of the mounting member, which is in turn weldable to the circular shaft of the harrow tine to carry the cutting edge member in front of the lower end of the circular shaft of the harrow tine, where the front face of the cutting edge member forms a cutting edge of greater hardness than the harrow tine.

In a disclosed embodiment, the mounting member is greater in height than the cutting edge member such that flush placement of the cutting edge member against the front face of the mounting member at the lower end thereof leaves an upper portion in an exposed state reaching upwardly out from behind the cutting edge member to provide improved wear resistance at a higher portion of the harrow tine spaced upwardly from the cutting edge member.

In a disclosed embodiment, the front face of the mounting member, at the upper portion thereof, comprises a tapered portion that resides above the flat surface and narrows forwardly to a pointed edge.

In a disclosed embodiment, the flat surface of the front face of the mounting member is recessed rearwardly from an entirety of the pointed edge of the upper portion of the front face of the mounting member.

In a disclosed embodiment, the front face of the cutting edge member is tapered to narrow in a direction moving away from the rear face to a sharpened front edge.

In a disclosed embodiment, the tapered portion of the front face of the mounting member and the front face of the cutting edge member are tapered at a matching angle.

In a disclosed embodiment, a thickness of the cutting edge member measured from the rear face thereof to the sharpened front edge equals a thickness of the mounting member measured from the flat surface of the front face of the mounting member to the pointed edge of the tapered portion of the mounting member.

In another disclosed embodiment, the front face of the cutting edge member is flat.

In one such embodiment, a thickness of the cutting edge member measured between the front and rear faces thereof is uniform and less than a thickness of the mounting member measured from the flat surface of the front face of the mounting member to the pointed edge of the upper portion of the mounting member.

In a disclosed embodiment, at the upper portion of mounting member, the mounting member narrows toward a top end of the mounting member in a thickness dimension and a width dimension.

In a disclosed embodiment, the mounting member comprises a tapered region behind the flat surface that decreases in thickness moving away from the lower end of the mounting member.

In a disclosed embodiment, the flat surface of the mounting member is situated closer to the pointed edge of the upper portion of the mounting member than to the rear side of the mounting member, and the cutting edge member is attached to the flat surface of the mounting member by a brazed joint, whereby spacing of the flat surface of the mounting member from the rear side thereof reduces exposure of the brazed joint to heat during welding of the rear side of the mounting member to the circular shaft of the harrow tine.

According to a second aspect of the invention, there is provided a tine with a cutting edge, the harrow tine comprising:

a circular shaft formed of spring steel and having a front surface and an opposing rear surface;

a prefabricated mounting member welded to the circular shaft and comprising a solid body of chromium carbide that is harder than the spring steel of the circular shaft, the solid body having a predefined shape comprising a front face and an opposing rear side, the front face having a flat surface at a lower end thereof and the rear side having a concavely arcuate curvature residing in conforming abutment with a front face of the circular shaft adjacent a lower end thereof in a position placing the front face of the mounting member forwardly of the front surface of the circular shaft; and a cutting edge member of geometric shape brazed to the flat surface of the front face of the mounting member and comprising tungsten carbide that is harder than the chromium carbide and the spring steel, the cutting edge member having a front face and an opposing flat rear face that resides in flush abutment against the flat surface of the front face of the mounting member with a remainder of the cutting edge member residing in an exposed position in front of the prefabricated mounting member so that the front face of the cutting edge member forms a hardened cutting edge of greater hardness than the circular shaft at a position forward thereof.

In a disclosed embodiment, the mounting member is greater in height than the cutting edge member and reaches upwardly out from behind the cutting edge member to provide improved wear resistance at a higher portion of the tine spaced upwardly from the cutting edge member.

According to a third aspect of the invention, there is provided a method of providing a cutting edge on a circular shaft of a harrow tine made of spring steel, the method comprising:

(a) obtaining a prefabricated mounting member comprising a solid body of chromium carbide, said solid body having a predefined shape that comprises a front face having a flat surface, and a rear side that lies opposite the front face and has a concavely arcuate curvature;

(b) welding said mounting member to the circular shaft adjacent a lower end thereof with the concavely arcuate curvature of the rear side of the solid body in a conforming position against a front surface of the circular shaft and with the front face of the mounting member residing forwardly of the front surface of the circular shaft; and (c) before or after step (b), with a cutting edge member of geometric shape and comprising tungsten carbide, brazing said cutting edge member to the mounting member in a position over the flat surface of the front face thereof with a flat rear face of the cutting edge member in flush abutment with the flat surface of the front face of the mounting member and a remainder of the cutting edge member residing in an exposed position in front of the prefabricated mounting member;

whereby a front face of the cutting edge member defines a hardened cutting edge carried ahead of the circular shaft of the harrow tine on a side of the mounting member opposite said shaft.

In a disclosed embodiment, step (c) comprises brazing said cutting edge member to the mounting member in a position leaving an exposed portion of the mounting member reaching out from behind the cutting edge member, and step (b) comprises welding the mounting member to the circular shaft in a position placing the exposed portion over the circular shaft of the harrow tine at a distance from a lower end thereof, whereby the exposed portion of the mounting member provides improved wear resistance at a portion of the harrow tine spaced away from the cutting edge member.

In a disclosed embodiment, step (b) comprises welding the mounting member to the circular shaft in a position placing the exposed portion over the circular shaft at a higher portion of the harrow tine that is spaced upwardly from the cutting edge member.

BRIEF DESCRIPTION OF THE DRAWINGS

In the accompanying drawings, which illustrate exemplary embodiments of the present invention:

FIG. 2 is a close up side view of the cutting edge attachment on one of the shafts of the tine of FIG. 1.

FIG. 3 is a close up perspective end view of the cutting edge attachment of FIG. 2.

FIG. 6 is a perspective view of a cutting edge attachment of a third embodiment of the present invention.

FIG. 7 is a front view of the cutting edge attachment of FIG. 6.

FIG. 8 is a side view of the cutting edge attachment of FIG. 6.

DETAILED DESCRIPTION

Figure 1:
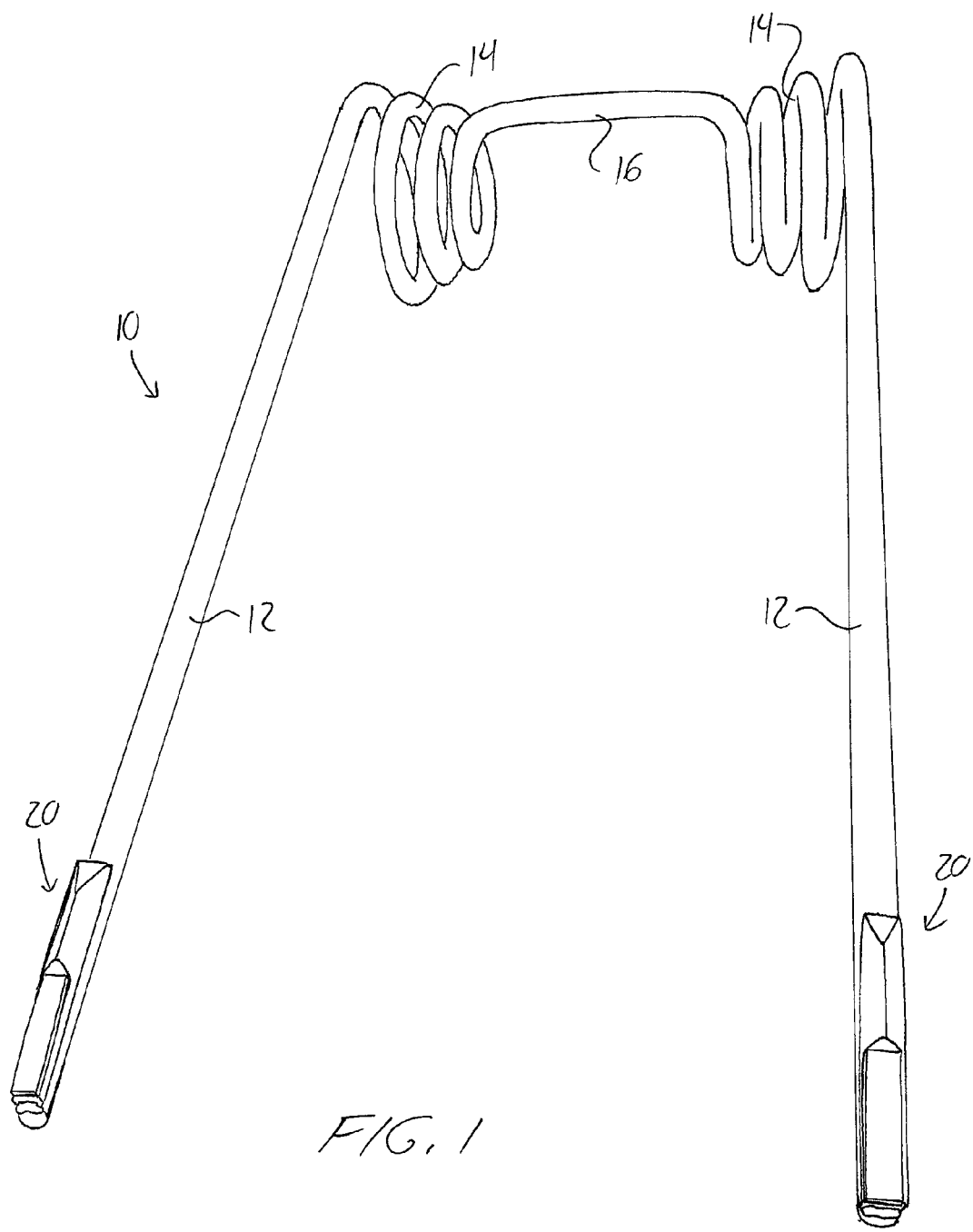
FIG. 1 is a perspective view of a double coil spring harrow tine featuring a two piece cutting edge attachment of a first embodiment of the present invention on each downwardly extending shaft of the tine.

FIG. 1 illustrates application of the present invention to a conventional double coil spring tine 10 consisting of two shafts 12 depending downward from the outer ends of a pair of coaxial coils 14 that are horizontally spaced apart from one another along their shared horizontal axis by a central cross-bar 16. The present invention adds a cutting edge attachment 20 to the lower end of each tine shaft 12 to increase the hardness of the structure on the leading side of the shaft that engages in the ground during use of the tine.

More particularly, the illustrated embodiments employ a two-piece attachment structure in which a base or mounting member 22 is made of a first material suitable for welded attachment to the tine shaft, and a working or cutting edge member 24, 24' of a second harder material is carried at an exposed position at the front side of the mounting member 22 to provide improved durability at the bottom end of the tine shaft. This provides the benefit of allowing use of a highly durable material like tungsten carbide to form the cutting edge of the tine, while allowing welded installation of the attachment despite the tungsten carbide's unsuitability for welded attachment to the spring steel of the tine.

Forming the mounting member 22 of a weld-friendly material such as chrome carbide, which has a hardness greater than that of the spring steel but less than that of the tungsten carbide, thus allows easy installation of the attachments with conventional welding techniques for secure, relatively permanent fastening to the tine, while the attachment of the cutting edge piece to the mounting member, for example by brazing, further improves the durability of the at the bottom end of the tine shaft compared to use of the chrome carbide piece alone.

Figure 5:
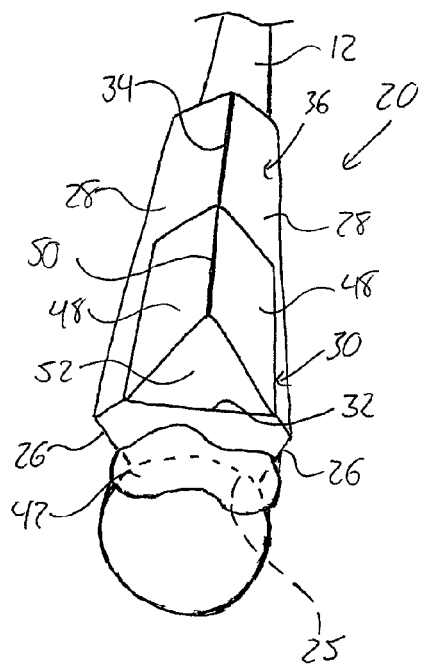
FIG. 5 is a close up perspective end view of the cutting edge attachment of FIG. 4.
Figure 9:
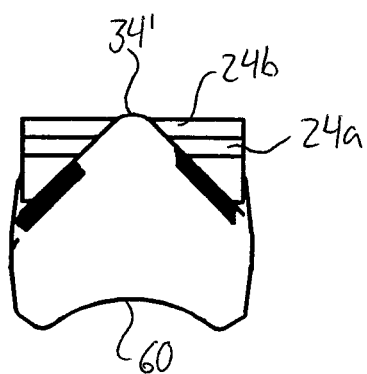
FIG. 9 is an end view of the cutting edge attachment of FIG. 6 from an upper end thereof.

Mounting members 22 of the same shape are used in the two illustrated embodiments. With reference to FIG. 5, a backside 25 of the mounting member is arcuately curved in a concave manner to conform with the convex peripheral surface of the circular-section tine shaft 12 on the front side of the shaft that leads the opposing rear side when the tine is conveyed along the ground by a harrow or other implement on which the tine is mounted. The mounting member 22 is linear in its length, which runs parallel to the longitudinal axis of the linear shaft 12 of the tine. The arcuate curve in the backside of the mounting member lies in cross-sectional planes perpendicular to its length, and is uniform over the full length of the mounting member. The concave backside of the mounting member spans less than 180-degrees so that the mounting member doesn't fully span the diameter of the tine shaft at its conforming interface against the front side of the shaft.

With continued reference to FIG. 5, moving forwardly away from its concave backside placed against the tine shaft, the mounting member 22 has rear side walls 26 that flare laterally outward to increase the width of the mounting member relative to its point of contact with the shaft. These rear side walls 26 are both flat and are symmetric to one another across a central longitudinal plane that contains the longitudinal axis of the tine shaft and cuts radially through the apex of the concave backside of the mounting member. Front side walls 28 are likewise flat and symmetric about the central longitudinal plane, and converge forwardly from the rear side walls 26, providing a forwardly tapered shape that narrows forwardly from the widest point of the mounting member. At the widest point of the mounting member, i.e. in the plane containing the two parallel edges at which the front and rear side walls meet on the opposite sides of the mounting member, the mounting member preferably has a width equal to or slightly exceeding the diameter of the tine shaft, thus presenting a full width shield over the forward facing half of the shaft circumference for optimum protection thereof by the harder mounting member.

At a lower portion 30 of the mounting member 22 the front side walls 28 are truncated by a plane that is parallel to the length of the mounting member and parallel to the tangent of the apex of the concave backside of the member, thus forming a flat front face 32 over the height of this lower portion of the mounting member 22. Above this flattened lower portion 30 of the mounting member 22, the front side walls 28 are not truncated, and instead intersect with another to form a forwardly pointing peak that runs in the lengthwise direction of the mounting member to define a linear edge 34 at an upper portion 36 of the mounting member. The sharpened peak at the front of the upper portion of the mounting member is believed to better break up straw during use of the implement, and thereby help the straw clear the tine as the implement moves forward.

At the upper portion 36 of the mounting member 22, the intersecting front side walls 28 thus form two sides of a right-angle triangular prism that runs upward from the flattened lower portion 30 of the mounting member to the top end of the pointed linear edge 34, and whose imaginary third side is formed by the plane defined by the maximum width of the cutting member (i.e. the plane containing the parallel edges at which the front and rear side walls intersect at both sides of the cutting member). At the top of the mounting member 22, the triangular prism shape projecting forward from the maximum width of the cutting member is truncated at an oblique plane so as to form a triangular upper face 38 that slopes downwardly and forwardly from the top end of the member 22.

The mounting member 22 is welded to the tine shaft, for example as illustrated in the drawings by beads of welding material 40, 42 running downward along the shaft at the rear side walls 26 of the mounting member 22 and across the bottom end of the mounting member. The obliquely sloped upper end of the mounting member reduces the opportunity for straw to build up at the transition between the mounting member and the tine shaft during use of the implement.

In the first embodiment of FIGS. 1 to 3, the cutting edge member 24 is provided in the form of a flat, rectangular, bar-shaped piece of tungsten carbide. The flat piece 24 has a length spanning that of the flattened lower portion 30 of the mounting member, thus extending from the bottom end of the mounting member 22 up to the triangular face 44 at the right angle transition between the peaked upper portion 36 of the mounting member 22 and the flattened lower portion 30 recessed back from the peak 34 of the upper portion. The width of bar likewise spans the full width of the flattened front face 32 of the lower portion of the mounting member 22. The rectangular rear face of the flat piece 24 sits flush against the flattened front face 32 of the mounting member's lower portion. The thickness of the flat piece 24, measured from its flat rear face to its opposing flat rectangular front face 46, is the smallest of the piece's three dimensions, and is less than the distance by which the peaked upper portion of the mounting member 22 projects from the flat front face of the flattened lower portion of the mounting member 22. The flat front face of the bar 24 is thus recessed back from the linear edge 34 at the leading peak or point of the upper portion of the mounting member 22. The reduced thickness may contribute to prevention of straw buildup on the corners of the cutting edge member compared to use of a thicker rectangular piece.

Having the flattened front face of the mounting member 22 in a plane cutting through the front side walls, rather than positioned further back at or behind the widest point of the mounting member, acts to keep a notable distance between the rear side wall areas at which the mounting member is welded to the tine shaft and the flattened front area at which the cutting edge member 24 is brazed to the mounting member 22. This way, when the mounting member is welded onto the tine shaft sometime after the cutting edge member is brazed to the mounting member, the heat from the weld does not weaken the brazed joint. Accordingly, the cutting edge member can be brazed to the mounting member by the manufacturer, and the resulting prefabricated attachment assembly can then be installed by a single process of welding to the tine shaft by an installer (e.g. the implement owner) at the site where the implement is normally used, stored or serviced.

Figure 4:
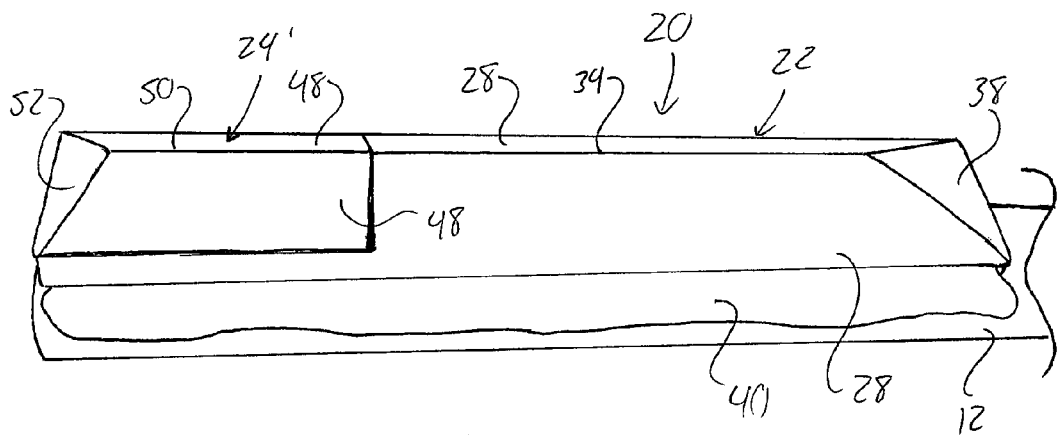
FIG. 4 is a close up side/front perspective view of a cutting edge attachment of a second embodiment of the present invention.

The second embodiment of FIGS. 4 and 5 differs from the first embodiment only in the shape of the cutting edge member 24', which instead of a thin, bar-like rectangular prism, has the shape of an obliquely truncated triangular prism. In the second embodiment, the cutting edge member thus has a form more similar to the upper portion of the mounting member than the flat bar cutting edge member 24 of the first embodiment.

The triangular cutting member 24' has a flat rear face that sits flush against the flat front face of the lower portion of the mounting member 22, and two sides walls 48 that converge together forwardly from the flat rear face of the member 24' to intersect at a linear peak 50. The upper end of the cutting edge member 24' is a triangular surface lying at a right angle to the flat rear face of the cutting edge member 24' so as to abut flush against the matching triangular surface 44 at the lower end of the mounting member's upper portion. The lower end of the cutting edge member 24' is where the piece deviates from its otherwise right-angle prism shape, as the lower end is truncated by an oblique plane to define a triangular lower end surface 52 sloping upwardly and forwardly from the lower end of the mounting member 22 to the peak 50 of the cutting edge member 24'. The oblique angle of the bottom end of the carbide is to add strength as compared as to if the lower end of the carbide was at a 90-degree angle, which could create a sharper point at the lower end of the linear peak 50.

The thickness of the triangular cutting edge member, i.e. the perpendicular distance from its flat rear face to its forward peak, matches the perpendicular distance by which the upper portion of the mounting member projects forwardly from the flat front face of the lower portion. The flat rear face of the triangular cutting edge member 24' has a width matching that of the flat front face of the lower portion of the mounting member 22, and the angle at which the side walls 48 of the cutting edge member 24' converge matches the angle of convergence of the front side walls 28 of the mounting member. Accordingly, the linear edge formed by the peak 50 of the cutting edge member 24' forms a continuous, in-line extension of the linear peak edge 34 of the upper portion of the mounting member 22, and the side walls 48 of the cutting edge member 24' each form a continuous, coplanar extension of the respective front side wall 28 of the mounting member 22.

In each embodiment, the forwardly narrowing shape of the tapered upper portion of the mounting member forms a sharpened leading edge of the mounting member at a height spaced a distance upward from the lower end of the tine shaft. In the second embodiment, the cutting member likewise tapers forwardly in order to narrow to a sharpened cutting edge aligned with the sharpened leading edge of the mounting member. In the first embodiment, the flat front face of the cutting edge member instead forms a wider, flat cutting edge set back from the sharpened leading edge of the mounting member. In each case, the lower portion of the mounting body carries a distinct, separately formed body of tungsten carbide to provide optimum durability and wear resistance at a location rising a short distance upward from the bottom end of the tine shaft, where the most ground contact will occur during use of the tine. The exposed upper portion of the mounting body, though not as strong as the cutting edge body, still provides increased wear resistance over a slightly higher portion of the tine shaft where some contact with the earth is still expected, compared to use of a tine without any hardened cutting edge attachment. Having the mounting body run the full length of the cutting edge body in front of it ensures a strong, secure connection of the cutting edge body to the tine.

FIGS. 6 to 10 illustrate a third embodiment of similar form to the first embodiment, but with some notable changes including replacement of the single bar-shaped piece of tungsten carbide with two shorter flat rectangular bar-shaped pieces 24a, 24b abutted end to end to form the cutting edge member 24", and use of a tapered shape at both the upper and lower portions of the mounting member 22' that increases the thickness of each portion when moving downward along the lengthwise dimension of the mounting member. The upper portion thus not only grows narrower moving in the forward direction when mounted on the tine in order produce a forwardly pointing peak 34', but also grows thinner (i.e. smaller in the fore/aft direction) moving upwardly along the tine, as does the lower portion. The upper portion also tapers in width at an upper region thereof toward the top end of the mounting member.

Each piece 24a, 24b of the two-piece cutting edge arrangement of the third embodiment occupies a respective half of the overall length of the mounting member's lower portion, and each substantially spans the full width of the flattened front face of the lower portion of the mounting member. The use of a plural number of smaller carbide pieces each spanning a different respective partial portion of the flattened front face of the mounting member reduces the risk of breakage of the carbide in the heating and cooling cycle it experiences during welding of the mounting member to the tine.

Figure 10:
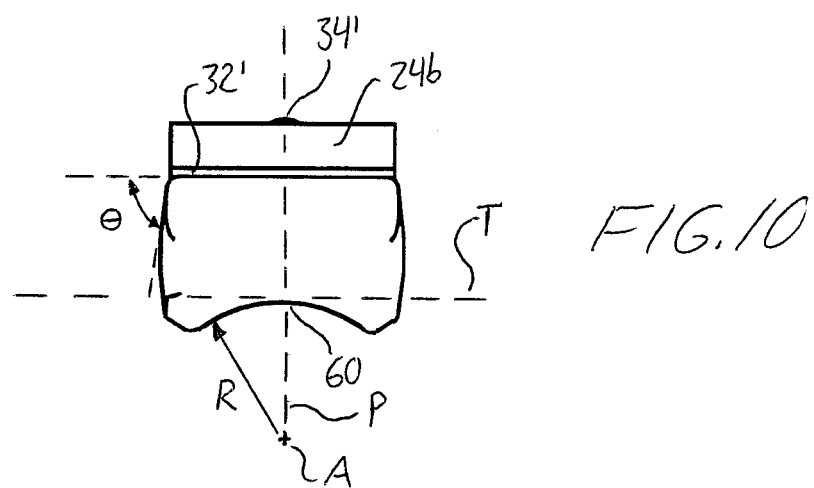
FIG. 10 is an end view of the cutting edge attachment of FIG. 6 from a lower end thereof.

The tapered thickness of the mounting member 22' of the third embodiment is best shown in FIG. 8. Turning briefly to FIG. 10, as in the other embodiments, the plane of the flattened front face 32' of the mounting member is perpendicular to a radial plane P that contains the apex 60 of the uniform-radius arcuate rear side of the mounting member and the axis A from which the radius R of the arcuate rear side is measured. However, unlike the other embodiments, the plane of the flattened front face 32' of the lower portion of the mounting member 22' is not parallel to axis A (which is generally coincident with the longitudinal axis of the tine shaft when the mounting member is installed thereon). Instead, referring to FIG. 8, the plane of the flattened front face 32' is obliquely sloped relative to this axis A at a small angle so that the lower portion of the mounting member of the grows thicker moving in a downward direction along the length of the mounting member. This thickness dimension may be measured as the distance between the flattened front face 32' and the apex 60 of the mounting member's concave backside. In other words, the plane of the front face 32' is tilted out of parallel alignment with a tangential plane T at the apex 60 of the concave rear side of the mounting member.

Similarly, the peak edge 34' of the upper portion 36' of the mounting member is obliquely sloped at a small angle relative to axis A and tangential plane T so that the upper portion of the mounting member also increases in thickness (for example, as measured between the apex 60 of its arcuately concave rear side and its leading peak 34') as you move in the downward direction along the axis A. In the illustrated embodiment, the peak edge 34' of the upper portion and the flattened front face 32' of the lower portion are parallel, i.e. sloped at the same angle relative to the axis A or tangential plane T.

When the mounting member is installed on a tine, it thus projects further forwardly from the tine at the lower end of the peak 34' than over the remainder of the upper portion, and projects further forwardly from the tine at the lower end of the lower portion than over the remainder of the lower portion. In the illustrated embodiment, the bottom edge of the flattened front face 32' of the lower carbide piece 24b is generally the same radial distance from axis A as the lower end of the upper portion's peak 34' so that the carbide pieces 24a, 24b of the cutting edge portion 24" project no further forward from the tine than the peak 34' of the mounting portion. That is, the combined thickness of the lower carbide piece 24b and the mounting member at the lower end thereof is generally equal to, and does not exceed the thickness of the mounting member at the lower end of the upper portion thereof.

As a result of this tapered configuration of the upper and lower portions of the mounting member, there is a less dramatic transition from the straight metal tine shaft or bar to the top of the mounting member when installed, while a significant material thickness at the bottom end of the mounting member remains intact in order to provide adequate support and room for welding of the mounting member to the tine.

In order to maintain a uniform width over the full length of the flattened front face 32' of the lower portion of the mounting member to allow for a uniform width of the cutting edge member to be mounted thereon, while still retaining a uniform overall width of the mounting member over the lower portion and over the peaked lower part of the upper portion, an angle of slope by which each side of the mounting member intersects the plane of the flattened front face 32' of the mounting member 22' varies as you move along the lengthwise direction of the lower portion of the mounting member. That is, the side of the mounting member slopes more dramatically inward toward the lateral center of the mounting member at the top end of the flattened front face 32' than at the lower end so that the resulting width of the flattened front face is the same at both the thinner top end of the mounting member's lower portion and the thickener bottom end of the mounting member's lower portion.

Figure 11:
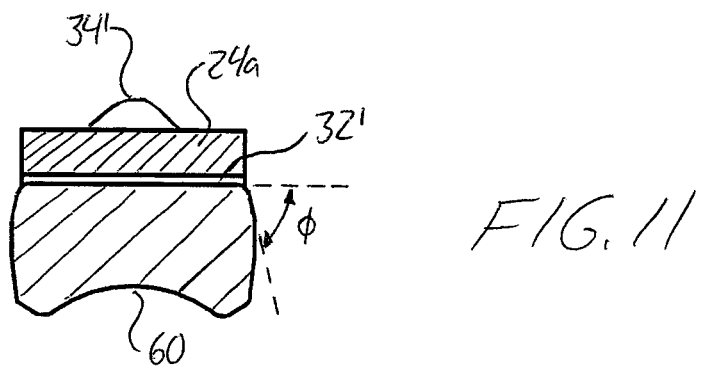
FIG. 11 is a cross-sectional view of the cutting edge attachment of FIG. 8 as taken along line XI-XI thereof.

This is best illustrated by reference to FIGS. 10 and 11, where the acute angle measured between the plane of the flattened front face 32' and the plane of side wall joined thereto on each side of the mounting member is labelled ⊖ at the lower end of the mounting member (FIG. 10), and is labelled φ in a cross-sectional plane near the upper end of the lower portion (FIG. 11), and φ is less than ⊖. The cross-section of the mounting member is symmetric about plane P, and so although the side wall to front face angle is marked only one side of the mounting member in each of these figures, the other side is a mirror image, and thus features the same angular configuration between the respective side wall and the flattened front face. The angle of each of these side walls of the mounting member varies smoothly over the lengthwise direction from one end of the lower portion to the other.

To further increase the smoothness of the transition between the upper end of the mounting member and the tine shaft, the upper portion of the mounting member of the third embodiment is not only tapered in thickness by the slope of the plane of the upper face 38', but additionally tapers in width, as best seen at 62 in FIG. 7 by convergence of the side walls toward one another in a manner symmetric about the plane P from near the prism-shaped lower part of the upper portion to the very top end of the upper portion.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A cutting edge attachment for a circular shaft of a harrow tine formed of spring steel, the attachment comprising:
   a prefabricated mounting member comprising a solid body having a predefined shape that is formed of chromium carbide and has a welded attachment to the spring steel of the harrow tine, the solid body having a front face and an opposing rear side, the rear side having a concavely arcuate curvature placed in conformance with a front surface of the circular shaft of the harrow tine adjacent a lower end thereof to position the front face of the mounting member in front of the front surface of the circular shaft;
   a cutting edge member of geometric shape and comprising tungsten carbide that is harder than the chromium carbide and spring steel and is brazed to the mounting member, the cutting edge member having a front face and an opposing rear face that is conformingly placed against the front face of the mounting member at a lower end thereof with a remainder of the cutting edge member residing in an exposed position in front of the prefabricated mounting member;
   whereby the welded attachment of the mounting member to the circular shaft of the spring steel harrow tine carries the cutting edge member in front of the lower end of the circular shaft of the harrow tine, where the front face of the cutting edge member forms a tungsten carbide cutting edge of greater hardness than both the harrow tine and the chromium carbide mounting member.

2. The cutting edge attachment of claim 1 wherein the mounting member is greater in height than the cutting edge member such that flush placement of the cutting edge member against the front face of the mounting member at the lower end thereof leaves an upper portion in an exposed state reaching upwardly out from behind the cutting edge member to provide improved wear resistance at a higher portion of the harrow tine spaced upwardly from the cutting edge member.

3. The cutting edge attachment of claim 2 wherein the front face of the mounting member comprises a flattened lower portion against which the rear face of the cutting edge member is seated, and at the upper portion thereof, comprises a tapered portion that resides above the flattened lower portion and narrows forwardly to a pointed edge.

4. The cutting edge attachment of claim 3 wherein the flat surface of the front face of the mounting member is recessed rearwardly from an entirety of the pointed edge of the upper portion of the front face of the mounting member.

5. The cutting edge attachment of claim 4 wherein the front face of the cutting edge member is tapered to narrow in a direction moving away from the rear face to a sharpened front edge.

6. The cutting edge attachment of claim 5 wherein the tapered portion of the front face of the mounting member and the front face of the cutting edge member are tapered at a matching angle.

7. The cutting edge attachment of claim 6 wherein a thickness of the cutting edge member measured from the rear face thereof to the sharpened front edge equals a thickness of the mounting member measured from the flattened lower portion of the front face of the mounting member to the pointed edge of the tapered portion of the mounting member.

8. The cutting edge attachment of claim 1 wherein the front face of the cutting edge member is tapered to narrow in a direction moving away from the rear face to a sharpened front edge.

9. The cutting edge attachment of claim 1 wherein the front face of the cutting edge member is flat.

10. The cutting edge attachment of claim 3 wherein the front face of the cutting edge member is flat.

11. The cutting edge attachment of claim 4 wherein the front face of the cutting edge member is flat, and a thickness of the cutting edge member measured between the front and rear faces thereof is uniform and less than a thickness of the mounting member measured from the flattened lower portion of the front face of the mounting member to the pointed edge of the upper portion of the mounting member.

12. The cutting edge attachment of claim 2 wherein, at the upper portion of mounting member, the mounting member narrows toward a top end of the mounting member in a thickness dimension and a width dimension.

13. The cutting edge attachment of claim 2 wherein, at the upper portion of mounting member, the mounting member narrows toward a top end of the mounting member in a width dimension.

14. The cutting edge attachment of claim 1 wherein the front face of the mounting member comprises a flattened lower portion against which the rear face of the cutting edge member is seated, and the mounting member comprises a tapered region behind the flattened lower portion that decreases in thickness moving away from the lower end of the mounting member.

15. The cutting edge attachment of claim 3 wherein the flattened lower portion of the mounting member is situated closer to the pointed edge of the upper portion of the mounting member than to the rear side of the mounting member, and the cutting edge member is attached to the flattened lower portion of the mounting member by a brazed joint, whereby spacing of the flattened lower portion of the mounting member from the rear side thereof reduces exposure of the brazed joint to heat during welding of the rear side of the mounting member to the circular shaft of the harrow tine.

16. A method of providing a cutting edge on a circular shaft of a harrow tine made of spring steel, the method comprising:
(a) obtaining a prefabricated mounting member comprising a solid body of chromium carbide, said solid body having a predefined shape that comprises a front face having a flat surface, and a rear side that lies opposite the front face and has a concavely arcuate curvature;
(b) welding said mounting member to the circular shaft adjacent a lower end thereof with the concavely arcuate curvature of the rear side of the solid body in a conforming position against a front surface of the circular shaft and with the front face of the mounting member residing forwardly of the front surface of the circular shaft; and
(c) before or after step (b), with a cutting edge member of geometric shape and comprising tungsten carbide, brazing said cutting edge member to the mounting member in a position over the flat surface of the front face thereof with a flat rear face of the cutting edge member in flush abutment with the flat surface of the front face of the mounting member and a remainder of the cutting edge member residing in an exposed position in front of the prefabricated mounting member;
whereby a front face of the cutting edge member defines a hardened cutting edge carried ahead of the circular shaft of the harrow tine on a side of the mounting member opposite said shaft.

17. The method of claim 16 wherein step (c) comprises brazing said cutting edge member to the mounting member in a position leaving an exposed portion of the mounting member reaching out from behind the cutting edge member, and step (b) comprises welding the mounting member to the circular shaft in a position placing the exposed portion over the circular shaft of the harrow tine at a distance from a lower end thereof, whereby the exposed portion of the mounting member provides improved wear resistance at a portion of the harrow tine spaced away from the cutting edge member.

18. The method of claim 17 wherein step (b) comprises welding the mounting member to the circular shaft in a position placing the exposed portion over the circular shaft at a higher portion of the harrow tine that is spaced upwardly from the cutting edge member.

\* \* \* \* \*